US008109383B1

(12) United States Patent
Suderman et al.

(10) Patent No.: US 8,109,383 B1
(45) Date of Patent: Feb. 7, 2012

(54) MAGNETIC ASSEMBLY FOR LOADING AND CONVEYING FERROUS METAL ARTICLES

(75) Inventors: Donald A. Suderman, Newton, KS (US); Barry Voorhees, Newton, KS (US); Paul Scott, Valley Center, KS (US)

(73) Assignee: Bunting Magnetics Co., Newton, KS (US)

( * ) Notice: Subject to any disclaimer, the term of this patent is extended or adjusted under 35 U.S.C. 154(b) by 0 days.

(21) Appl. No.: 12/850,919

(22) Filed: Aug. 5, 2010

(51) Int. Cl.
*B65G 15/30* (2006.01)
*B65G 15/58* (2006.01)
(52) U.S. Cl. .................... 198/690.2; 198/805
(58) Field of Classification Search .................. 198/805, 198/690.1
See application file for complete search history.

(56) References Cited

U.S. PATENT DOCUMENTS

| | | | | |
|---|---|---|---|---|
| 3,754,313 A * | 8/1973 | McCulloch | .................. | 198/381 |
| 5,848,684 A * | 12/1998 | Furlani et al. | .................. | 198/805 |
| 5,865,298 A * | 2/1999 | Furlani et al. | .................. | 198/805 |
| 5,981,087 A * | 11/1999 | Furlani et al. | .................. | 428/626 |

* cited by examiner

*Primary Examiner* — Kavel Singh
(74) *Attorney, Agent, or Firm* — Kenneth H. Jack; Davis & Jack, L.L.C.

(57) ABSTRACT

An assembly for loading and conveying ferrous metal articles including a magnet having north and south poles, an axis between the north and south poles, the poles forming an annular belt support; a powered conveyor belt extending over the belt support for rotating the magnet, the magnet being segmented along the polar axis, a first polar axis segment being a magnet mounting plate, a plurality of second polar axis segments being sub-magnets, each such sub-magnet overlying or underlying the magnet mounting plate having north and south poles, and having a polar axis, and a third polar axis segment being a sheath extending annularly about the magnet's first and second polar axis segments, the sheath having a radially outer surface forming the magnet's annular belt support.

4 Claims, 7 Drawing Sheets

MAGNETIC ASSEMBLY FOR LOADING AND CONVEYING FERROUS METAL ARTICLES

FIELD OF THE INVENTION

This invention relates to combinations of mechanical belt conveyors and magnetic rolls and pulleys. More particularly, this invention relates to combinations of such machinery for automatically loading and conveying ferrous articles such as scrap steel and small steel parts.

BACKGROUND OF THE INVENTION

Turn back pulleys or rollers of powered continuous loop belt conveyors are known to be specially adapted to include embedded or internally housed permanent magnets. Where such turn back rollers or pulleys are so adapted, they advantageously cause the continuous loop conveyor to additionally perform an automatic ferrous metal attracting and loading function. Where, for example, such a magnetically adapted conveyor pulley is positioned over a moving stream of materials (or a relatively moving stream of materials resulting from movement of the conveyor assembly) ferrous metal parts and/or scrap steel contained within the stream are advantageously drawn out of such stream and into a magnetically attached and contacting relationship with the conveyor belt at points radially overlying the magnetic pulley. The continuously looping motion of the conveyor belt over the magnetic pulley draws the ferrous metal parts or scrap steel along the conveyor and away from the magnetic pulley for conveyance along the conveyor belt to a desired remote location for disposal or separate storage.

A common drawback or deficiency of such magnetic conveyor pulley and conveyor belt combinations is an insufficiency or deficit in the magnetic strength and density of lines of magnetic flux which extend from the pulley at the conveyor's end. As a result of such deficiency, such common magnetic pulley and conveyor combinations have only a limited capability to attract and convey away ferrous magnetic parts and scrap materials.

Such magnetic attraction deficit commonly results from an adoption of an intuitive mechanical arrangement of the polar axes of the permanent magnets which are contained within or supported by the magnetic conveyor pulley. Just as the lateral cross-sectional shape of a conveyor pulley is circular, commonly known magnetic adaptations of conveyor pulleys have arranged the polar axes of the contained or supported permanent magnets to emanate magnetic flux outwardly in a substantially circular radial array. Such radial arrays of magnetic flux are known to result from either one of two commonly known modes of mounting of permanent magnets within or upon a continuous loop conveyor's pulley. In one such mode, the permanent magnets are arranged in multiple N,N,S,S,N,N . . . polar orientation chains, each such magnet chain extending parallel with the pulley's rotation axis and such magnet chains being arranged circumferentially about the pulley's annular outer periphery. In the other mode, U-shaped or horseshoe magnets which present their north and south poles at paired distal ends of the magnet's arms are similarly arranged in a radial array about the pulley. Where such U-shaped magnet configuration is utilized, a paramagnetic axle core within the pulley is often utilized as a magnetic armature for completing the "U" configuration of such north and south magnet arm pairs. Both modes of conveyor pulley magnet adaptation described above produce a circumferential array and extension of lines of magnetic flux, and in both the resultant magnetic flux is undesirably weak in all radial directions.

The instant inventive assembly for loading and conveying ferrous metal articles solves or ameliorates problems and deficiencies discussed above by configuring the magnetically adapted conveyor pulley to be or function as a substantially single magnet having a north/south polar axis which intersects the pulley's axis of rotation at a perpendicular or substantially 90° angle, and which crosses the entire lateral cross-sectional diameter of the pulley.

BRIEF SUMMARY OF THE INVENTION

A first structural component of the instant inventive assembly for loading and conveying ferrous metal articles comprises a magnet having a north pole, a south pole, and a rotation axis extending between the north pole and the south pole, the north and south poles being configured as or forming an annular belt supporting surface. In a preferred embodiment, such annular belt supporting surface is continuously circumferential and has a circular lateral cross-sectional shape.

A further structural component of the instant inventive assembly comprises a continuous loop conveyor belt which extends over and frictionally contacts the magnet's arcuately curved north and south poles.

A further structural component of the instant inventive assembly comprises means for rotating the magnet about its rotation axis. Such rotation means may comprise the conveyor belt where the magnet functions as a conveyor belt supporting idler pulley. Alternatively, such means may comprise drive axle structures and assemblies which may couple with a motor driven rotary power source such as an electric motor.

By configuring the conveyor or pulley component of the instant inventive assembly as a permanent magnet having opposing curved conveyor belt supporting north and south poles, magnetic flux (i.e., the magnetic field characteristic imposed by a permanent magnet upon a physical space or volume) emanating from pulley/magnet is augmented and strengthened along the full diameter of the pulley/magnet, resulting in overall enhanced magnetic strength.

In use of the inventive assembly, streams of ferrous article containing materials passing beneath the assembly are advantageously exposed to the rotating magnetic field emanating from the conveyor's pulley/magnet. As a result, ferrous scrap metal or parts within the stream are attracted and drawn from the stream into contact with the conveyor for carriage to a remote location for disposal or separate storage.

Accordingly, it is an object of the instant invention to provide an assembly for loading and conveying ferrous metal articles which provides structures, as described above, and which arranges those structures in relation to each other, as described above, for the performance of beneficial functions, as described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
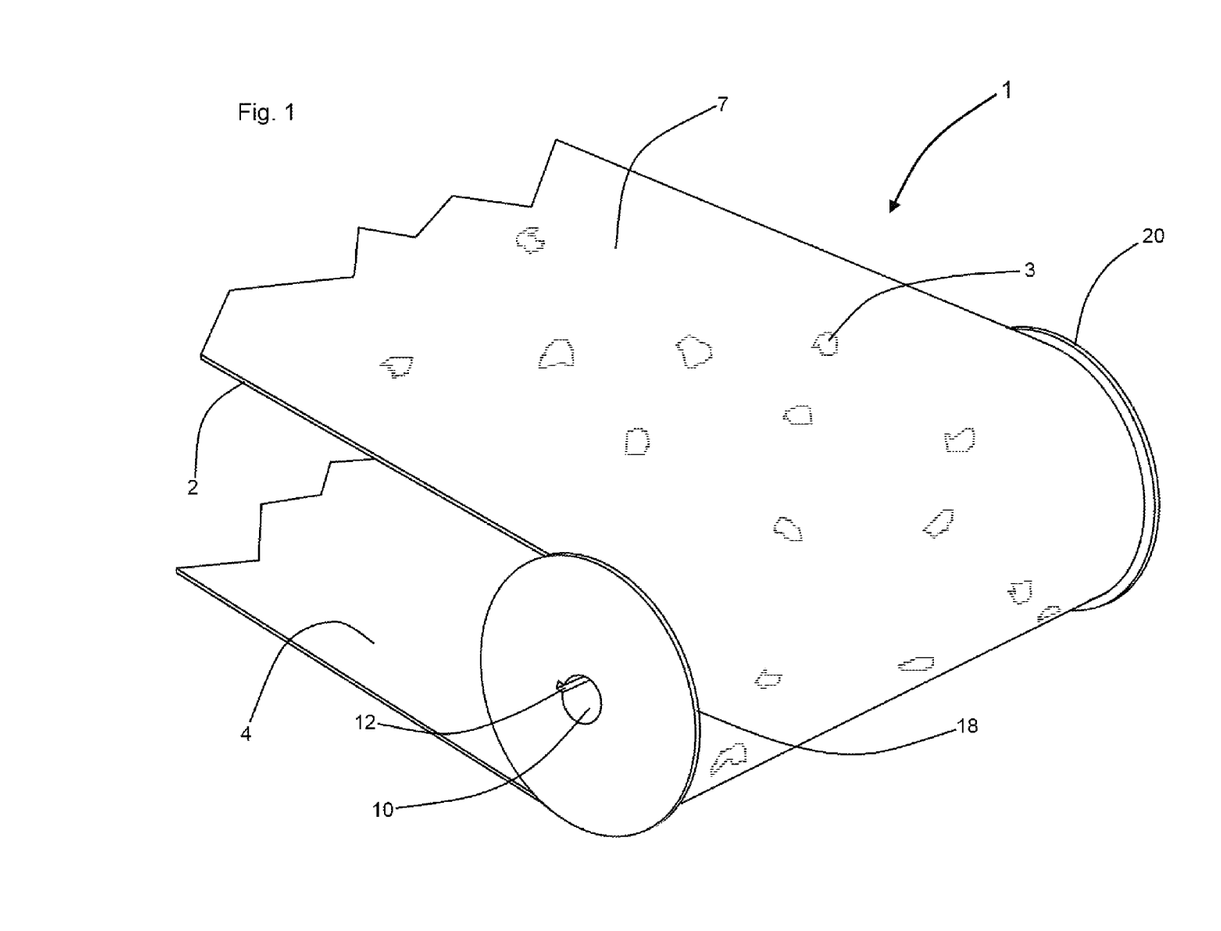
FIG. 1 is a partial perspective view of the instant inventive assembly.
Figure 2:
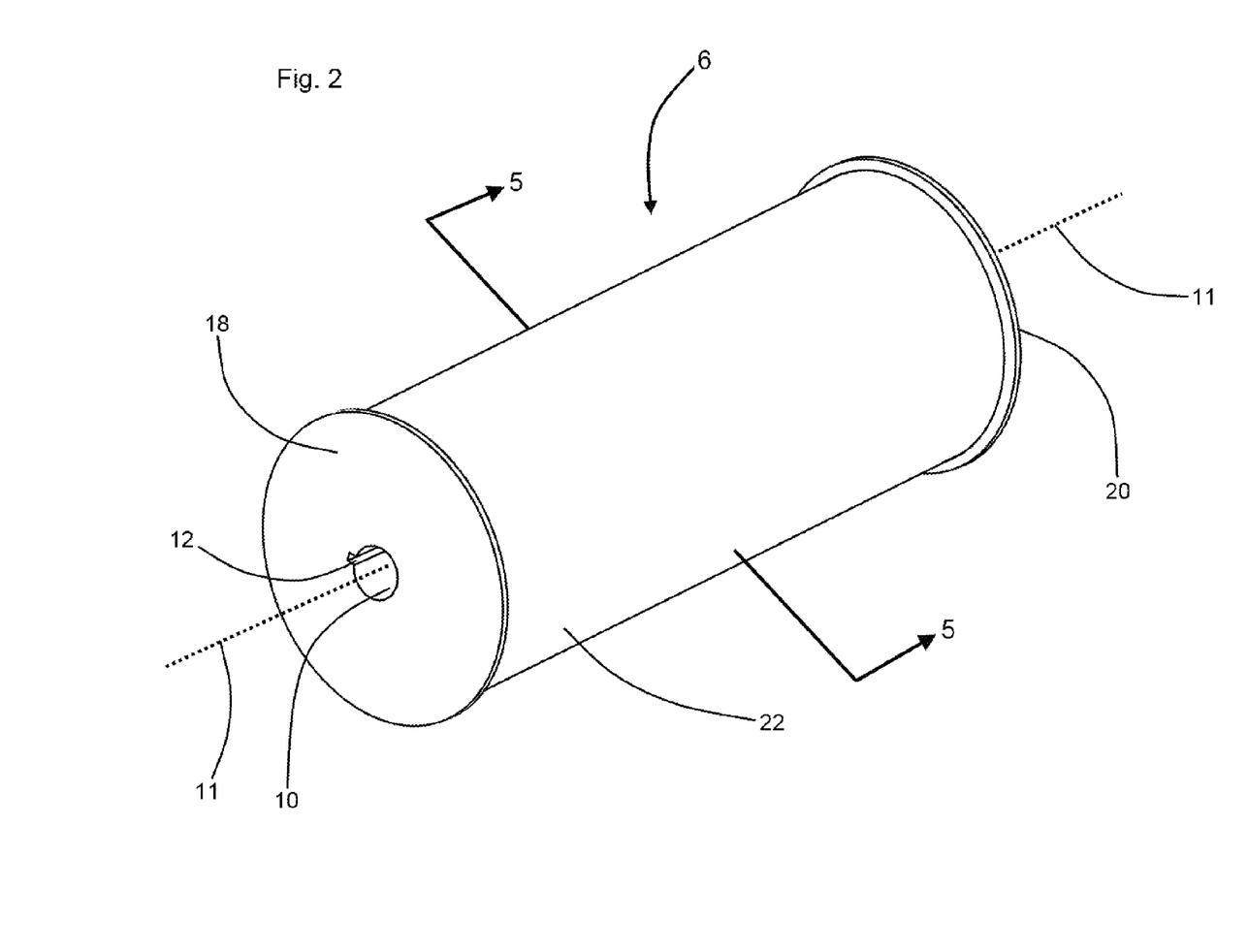
FIG. 2 redepicts FIG. 1, the view of FIG. 2 showing a conveyor belt component of the assembly removed, the view exclusively showing the magnet component of the assembly.
Figure 2A:
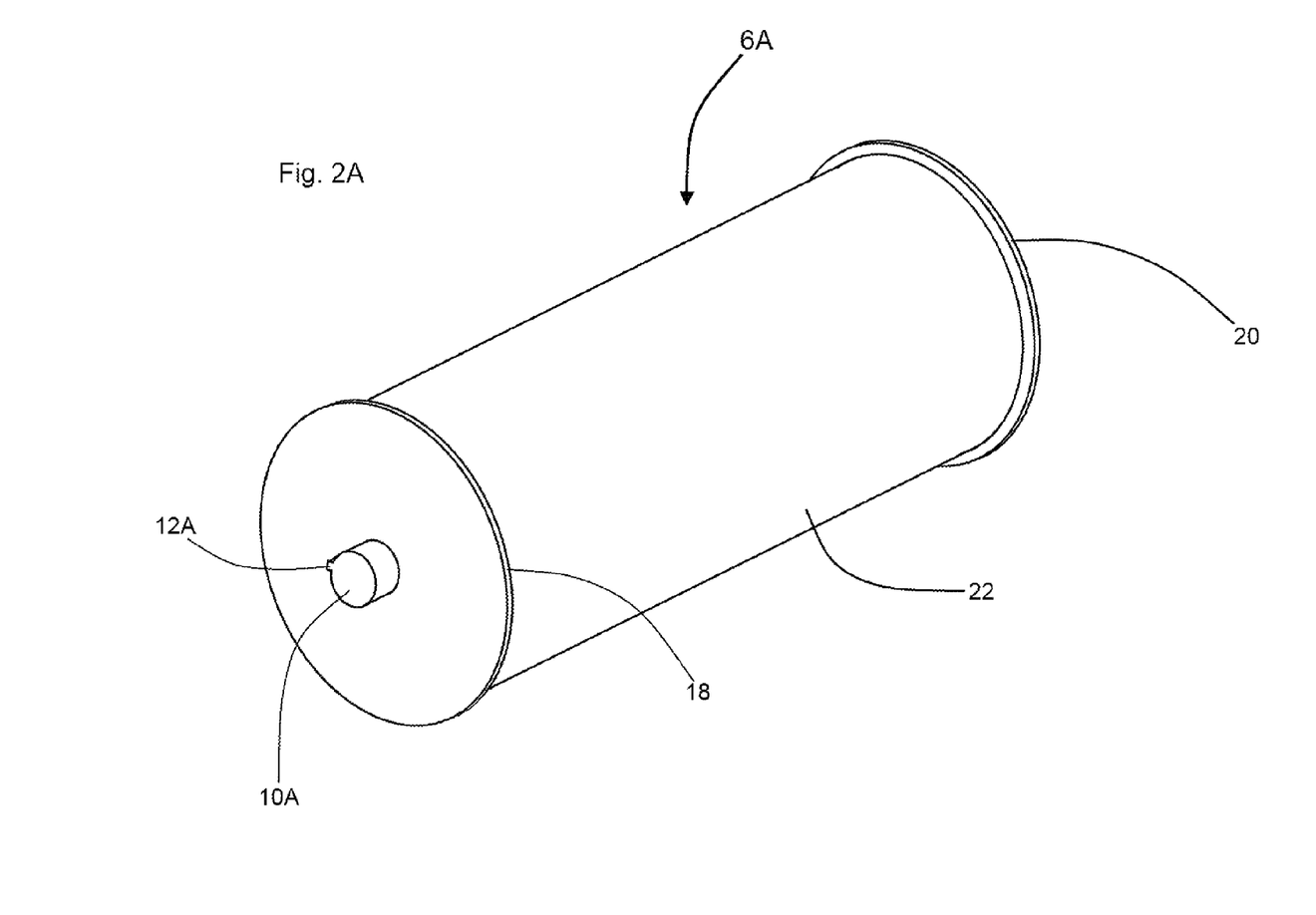
FIG. 2A redepicts FIG. 2, the FIG. 2A showing an alternative magnet axle assembly.
Figure 3:
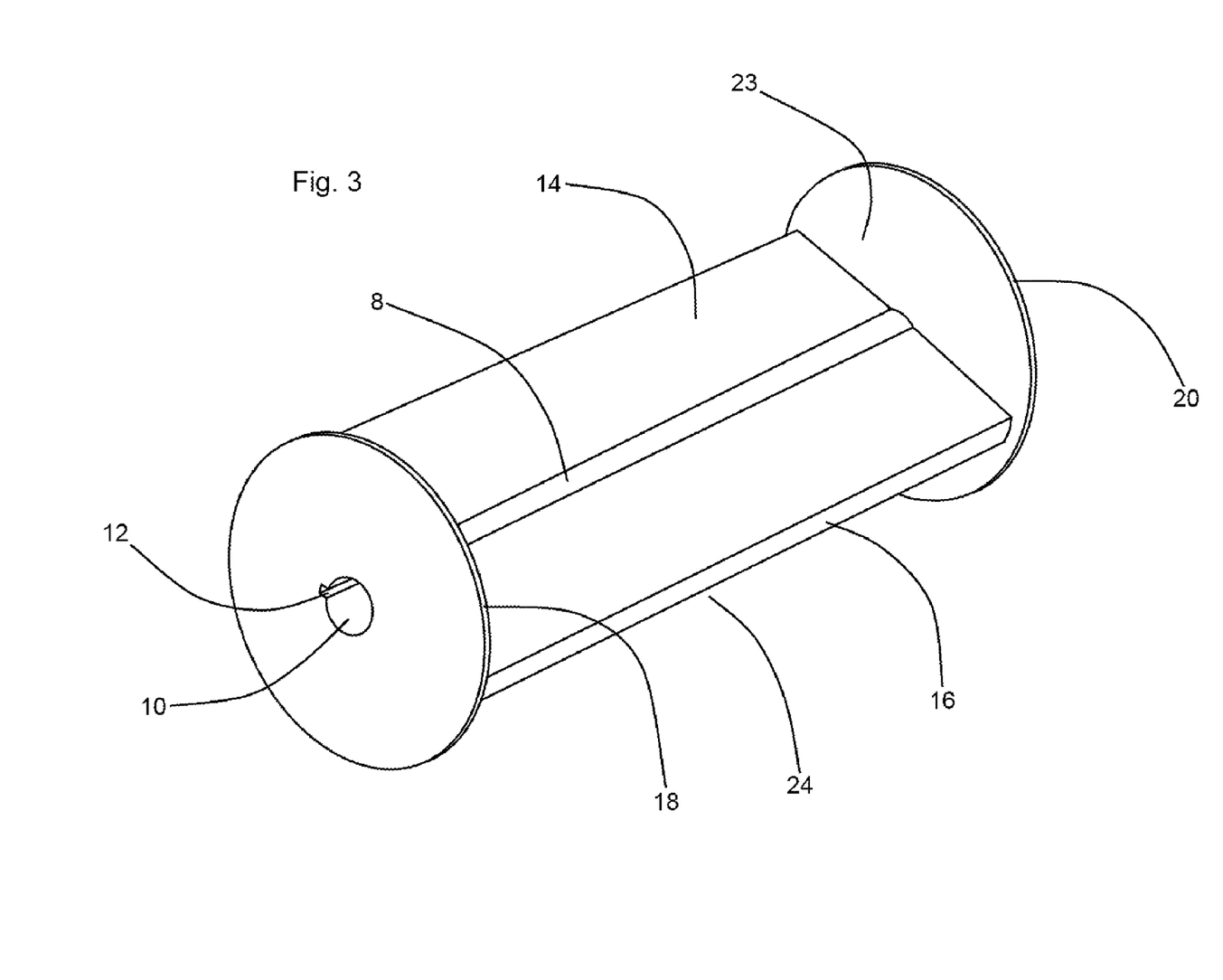
FIG. 3 redepicts FIG. 2, the view of FIG. 3 showing sheath and sub-magnet polar axis segments of the magnet removed.
Figure 4:
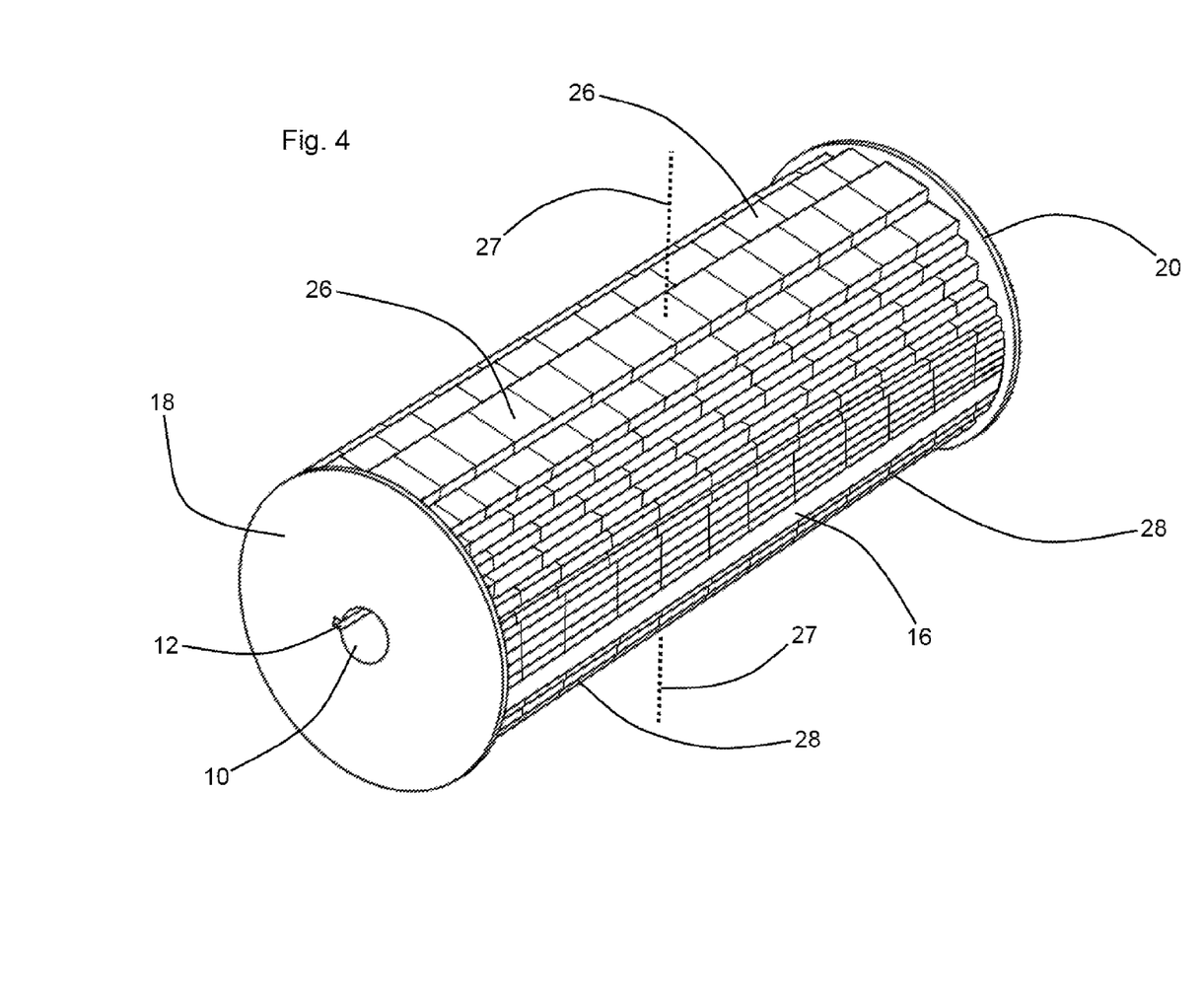
FIG. 4 alternatively redepicts FIG. 2, the view of FIG. 4 showing the sheath polar axis segment of the magnet removed.

Referring now to the drawings, and in particular to Drawing FIGS. 1 and 2, a preferred embodiment of the instant inventive assembly for loading and conveying ferrous metal articles is referred to generally by Reference Arrow 1. A major structural component of the assembly 1 comprises a permanent magnet which is referred to generally by Reference Arrow 6. The magnet 6 dually functions as a conveyor pulley having a rotation axis 11 and as means for attracting ferrous metal articles 3. In a preferred embodiment, referring further simultaneously to FIGS. 3 and 5, an axle shaft receiving sleeve 8 is aligned concentrically about and along the rotation axis 11, such sleeve 8 forming an axle shaft receiving bore 10. To facilitate transmission of rotary power from an axle shaft (not depicted within views) received within bore 10, a key slot 12 is provided. Alternatively, referring further simultaneously to FIG. 2A, an alternatively configured magnet component 6A presents journal axles 10A having rotation keys 12A. The axle shaft 10 and key slot 12 (or the journal axle 10A and key 12A, as the case may be) constitute means for rotating the magnet 6 or 6A about the rotation axis 11. Where such means are provided, motor means such as an electric motor drive (not depicted within views) coupled to the axle assembly is preferably further provided for rotatably moving the magnet 6 or 6A. Alternatively, in situations where the magnet 6 or 6A functions as a conveyor belt idler pulley, a provided conveyor belt 2 suitably functions as the means for rotating the magnet 6 or 6A about the rotation axis 11. Where such alternate rotating means are provided, such means preferably further provides an electric motor powered drive pulley at an opposite discharge end of the assembly 1. In such drive configuration, friction between the inner surfaces 4 of the continuous loop conveyor belt 2 and the circumferential outer surface 22 of the pulley 6 rotatably moves the pulley 6 upon the continuously looping motion of the conveyor belt 2.

Referring simultaneously to FIGS. 2-5, the magnet 6 preferably has a polar axis 27 which spans the lateral cross-sectional diameter of the magnet, and which substantially perpendicularly intersects the rotation axis 11. In a preferred embodiment, the magnet 6 is multiply segmented along the polar axis 27. A first polar axis segment of the magnet 6 preferably comprises a mounting plate 14,16. In a preferred embodiment, the mounting plate 14,16 is fixedly attached to or is wholly formed with the axle sleeve 8, and the mounting plate 14,16 preferably comprises paramagnetic or "mild" steel. Suitably, the mounting plate magnet segment 14,16 may alternatively comprise a non-paramagnetic metal such as stainless steel, brass, or aluminum.

Further polar axis segments of the magnet 6 preferably comprise pluralities or multiplicities of stacked sub-magnets 26 and 28 which respectively overlie and underlie the plate magnet segment 14,16. Each of the sub-magnet segments 26 or 28 preferably comprises a permanent magnet which is situated with respect to the magnet 6 so that its north/south polar axis aligns with and is substantially parallel to the magnet's polar axis 27.

Referring further simultaneously to FIGS. 2-5, a further polar axis segment of the magnet 6 preferably comprises a cylindrical sheath 21N,21S. The annular and circumferential outer surface 22 of the magnet's sheath segments 22N,22S preferably forms and functions as a circular cylindrical conveyor belt supporting surface. In a preferred embodiment, the magnet's polar axis sheath segments 21N,21S comprise a durable non-paramagnetic material such as non-magnetic stainless steel, brass, or aluminum. The non-paramagnetic character of the sheath segments 21N,21S advantageously allows lines of magnetic flux 33 emanating from the sub-magnet segments 26 and 28 to "transparently" pass through the magnet's sheath segments 21N,21S rather than undesirably armaturing the north and south poles of peripherally positioned sub-magnet segments 26 or 28.

Referring simultaneously to FIGS. 1-5, magnet end caps 18 and 20 are preferably provided, such caps preferably being fixedly attached to opposite axial ends of the axle sleeve 8, the mounting plate segment 14,16, and the sheath segment 21N, 21S. Upon such attachment and mounting of the end plates 18 and 20, they advantageously hermetically close the magnet's semi-cylindrical void spaces 23,24 which house the magnet's permanent magnet sub-segments 26 and 28.

Figure 5:
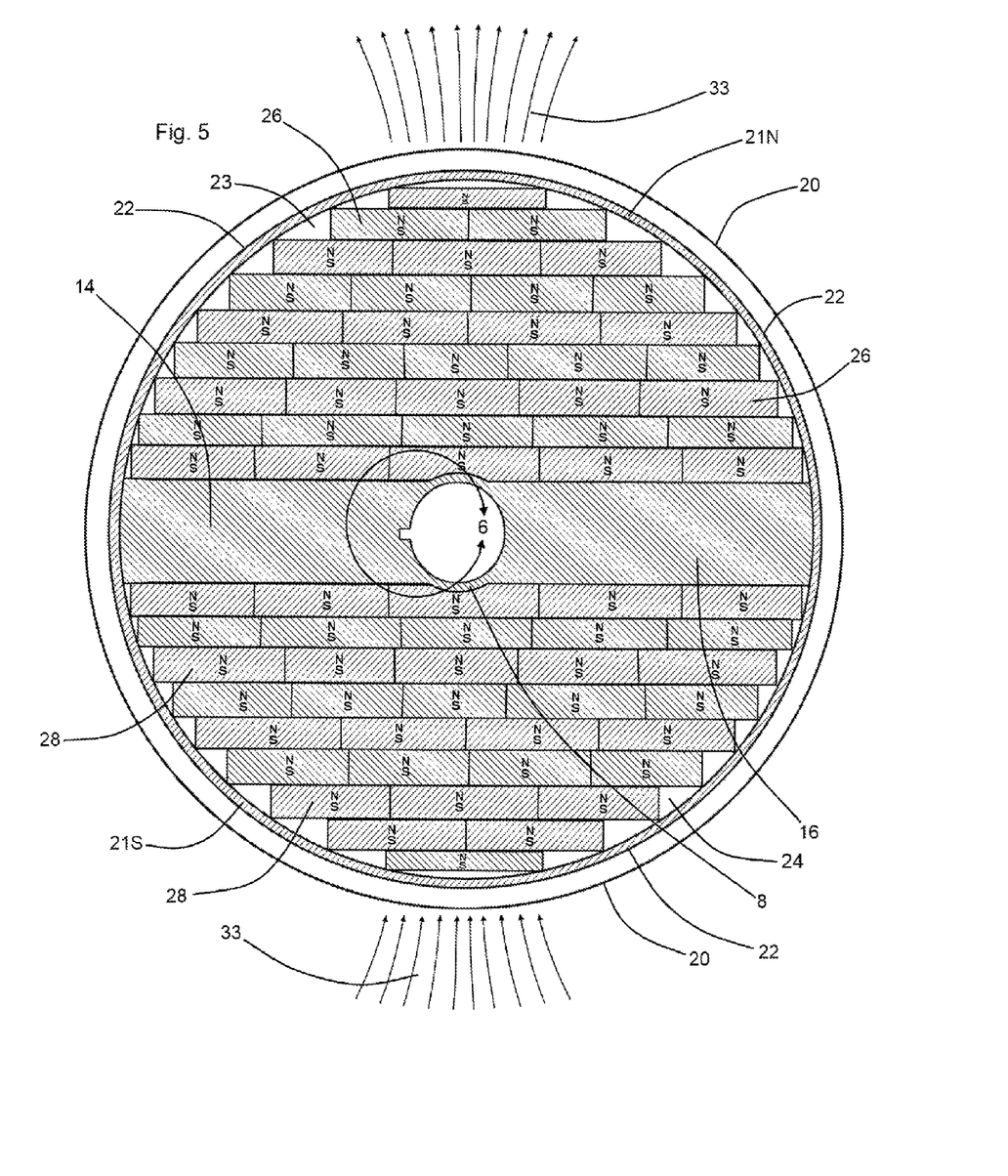
FIG. 5 is a sectional view as indicated in FIG. 2.
Figure 6:
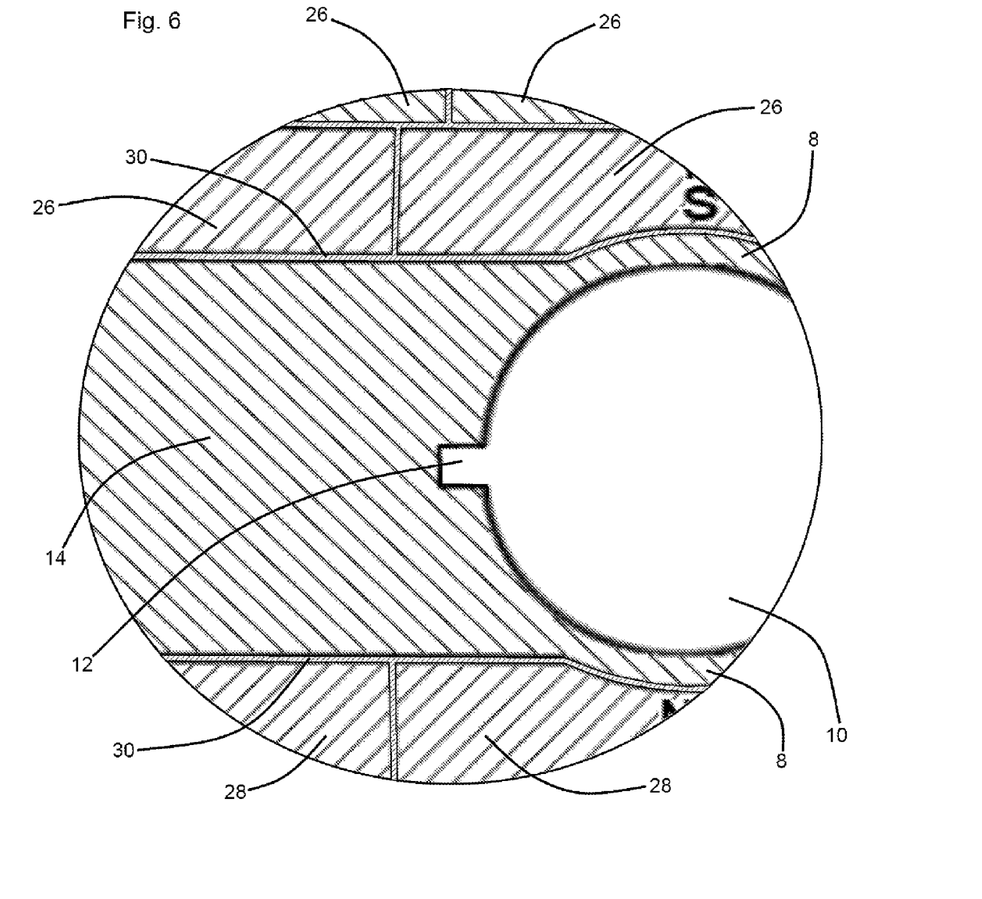
FIG. 6 is a magnified view of a portion of the structure depicted in FIG. 5, as indicated in FIG. 5.

Referring simultaneously to FIGS. 5 and 6, structural integrity of the magnet 6 in addition to that provided by the end caps 18 and 20 is provided by a deposition of a durable adhesive 30 over the surfaces of the magnet's sub-segments 26 and 28 and over the opposing surfaces of the mounting plate 14,16. In a preferred embodiment, the adhesive 30 comprises a cyanoacrylate based glue.

Referring simultaneously to FIGS. 1, 2, 4, and 5, the segmenting of the conveyor pulley/magnet 6 along the magnetic polar axis 27 facilitates a strengthening and augmentation of lines of magnetic flux 33 extending across the full diameter of the magnet 6. The magnetic flux lines 33, as drawn in FIG. 5, are representative of similar lines emanating from the complete semi-circular north half 21N of the magnet 6, and entering the complete semi-circular south half 21S of the magnet 6. As a result of such magnetic flux augmentation, ferrous magnetic articles 3 may be magnetically attracted from a relatively long distance and may be carried away upon the outer surface 7 of the conveyor belt 2 for separate disposal or separate storage.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An assembly for loading and conveying ferrous metal articles, said assembly comprising:

(a) a magnet having a north pole, a south pole, and a north/south polar axis, the magnet being segmented along the polar axis, a first segment among the magnet's polar axis segments comprising a magnet mounting plate, and a plurality of second segments among the magnet's polar axis segments comprising sub-magnets, each sub-magnet overlying or underlying the magnet mounting plate, and each sub-magnet having a north pole and a polar axis, each sub-magnet's polar axis having an alignment substantially parallel to the magnet's polar axis, the magnet further having a rotation axis, the north/south polar axis intersecting the rotation axis, and the magnet's north and south poles forming an annular belt supporting surface;

(b) a third segment among the magnet's polar axis segments, the third segment comprising a sheath extending annularly about the magnet's first and second polar axis segments, the sheath having a radially outer surface, and the magnet's annular belt supporting surface comprising the sheath's radially outer surface;

(c) a conveyor belt extending over the annular belt supporting surface; and (d) rotating means connected operatively to the magnet, the rotating means being adapted for rotating the magnet about the rotation axis, the sheath comprises comprising a non-paramagnetic material.

2. The assembly for loading and conveying ferrous metal articles of claim 1 wherein the rotating means comprise the conveyor belt or comprise an axle assembly.

3. The assembly for loading and conveying ferrous metal articles of claim 1 wherein the magnet mounting plate comprises paramagnetic steel.

4. The assembly for loading and conveying ferrous metal articles of claim 1 further comprising an adhesive deposition, the adhesive deposition extending over the first and second segments' surfaces.

* * * * *